Oct. 21, 1952 M. S. DANISCH 2,614,760

CONTROL SYSTEM FOR MAGNETIC RECORDERS

Filed June 29, 1945

Inventor
Marion S. Danisch by The Firm of Charles W. Hills Attys

Patented Oct. 21, 1952 2,614,760

UNITED STATES PATENT OFFICE 2,614,760

CONTROL SYSTEM FOR MAGNETIC RECORDERS

Marion S. Danisch, Chicago, Ill., assignor to Armour Research Foundation of Illinois Institute of Technology, Chicago, Ill., a corporation of Illinois Application June 29, 1945, Serial No. 602,251

5 Claims. (Cl. 242—54)

The present invention relates to an automatic control system for a magnetic reproducer or recorder and, more particularly, relates to an electrical control system for automatically rewinding a magnetizable wire or tape after reproduction or recording in a magnetic recording device.

In a magnetic recording device, as is well-known in the art, a longitudinally magnetizable wire or tape is wound onto one spool from another spool and at the same time, traverses a magnetic recording head for the purpose of causing electromagnetic variations for reproducing purposes or for inducing longitudinal magnetism in the wire for recording. At the end of the reproducing period or of the recording period, when the wire is completely wound on one reel and unwound from the other, it is necessary to rewind the wire on such other reel in order to prepare for the next operation. Unless such rewinding is effected at the proper time, there is the danger that the wire may be completely detached from the spool from which it is being unwound. For this reason, and for others, such as for convenience and for making the device foolproof, it is desirable to make the system automatic in operation.

An object of the present invention, therefore, is to provide an electrical control system for a magnetic recording or reproducing device to effect automatic rewinding following completion of either the reproducing operation or the recording operation.

A more specific object of the present invention is to provide an electrical control system for a magnetic recording or reproducing device which system is responsive to the amount of wire present on the spool on which the wire is wound and to that from which it is unwound in order to cause reverse drive of the wire at the end of the reproducing or playing period.

A further object of the present invention is to provide a simple and easily controlled electrical system for effecting automatic rewinding of a magnetic recording or reproducing device so as to require minimum attention and experience of the operator.

Other objects and advantages will be apparent from a study of the following specification taken with the drawing wherein.

Figure 1:
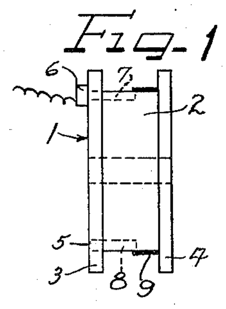
Figure 1 is a side view of a spool embodying a circuit making and breaking arrangement in which the circuit is opened as a result of almost complete unwinding of a wire from the spool.

Referring more particularly to Figure 1, numeral 1 denotes a spool of insulating material, such as Bakelite, plastic, etc., having a hub portion 2 flanked by two disk portions 3 and 4 preferably of the same material. On the side face of disk 3 there is provided a slip ring 5 which is adapted to slide in contacting relationship with a brush 6 connected to an external electric circuit. One or more longitudinally extending contact elements 7 and 8 are provided with their surfaces flush with the peripheral surface of hub portion 2, and are electrically connected to slip ring 5. It will be seen, therefore, that if the electrical circuit extends through a magnetizable wire 9, which is being unwound from the spool 1, that so long as the wire covers contact elements 7 and 8, a circuit will be completed extending from wire 9 through contact elements 7 or 8, slip ring 5, brush 6, to the remainder of the electric circuit. However, as soon as wire 9 has been unwound to an extent so as to uncover contact elements 7 and 8, such circuit will be interrupted.

Figure 2:
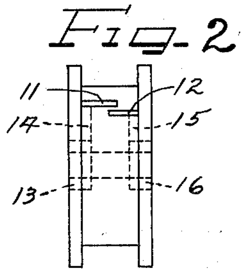
Figure 2 is a side view of a modified form of spool from that shown in Figure 1.

Figure 2 shows a modified from of a spool illustrated in Figure 1 but is simpler inasmuch as the slip ring is eliminated and, instead thereof, a pair of longitudinally extending contact elements 11 and 12, similar to contact elements 7 and 8 of Figure 1, are disposed in somewhat staggered relation as shown so that as long as the wire bridges the gap between the inwardly projecting ends of contact elements 11 and 12, the circuit is completed extending from a metallic hub portion 13, a radially extending metallic portion 14, element 11, the wire, element 12, radially extending metallic portion 15 and the hub portion 16. In other words, the structure in Figure 2 differs from that in Figure 1 in that the wire constitutes a very small portion of the circuit and in that the input and output leads are both axially disposed with respect to the spool thereby facilitating the electrical wiring which may be accomplished by grounding one of the hub portions 13 and 16. The structure shown in Figure 1 is illustrated in the circuit diagram of Figure 3 to be described hereinafter although it should be understood that the modification of the spool shown in Figure 2 may be substituted in such circuit for the type of structure illustrated in Figure 1. In fact, as far as the circuit is concerned, any switch, which is responsive to almost complete unwinding of the wire from the spool may be used.

Figure 3:
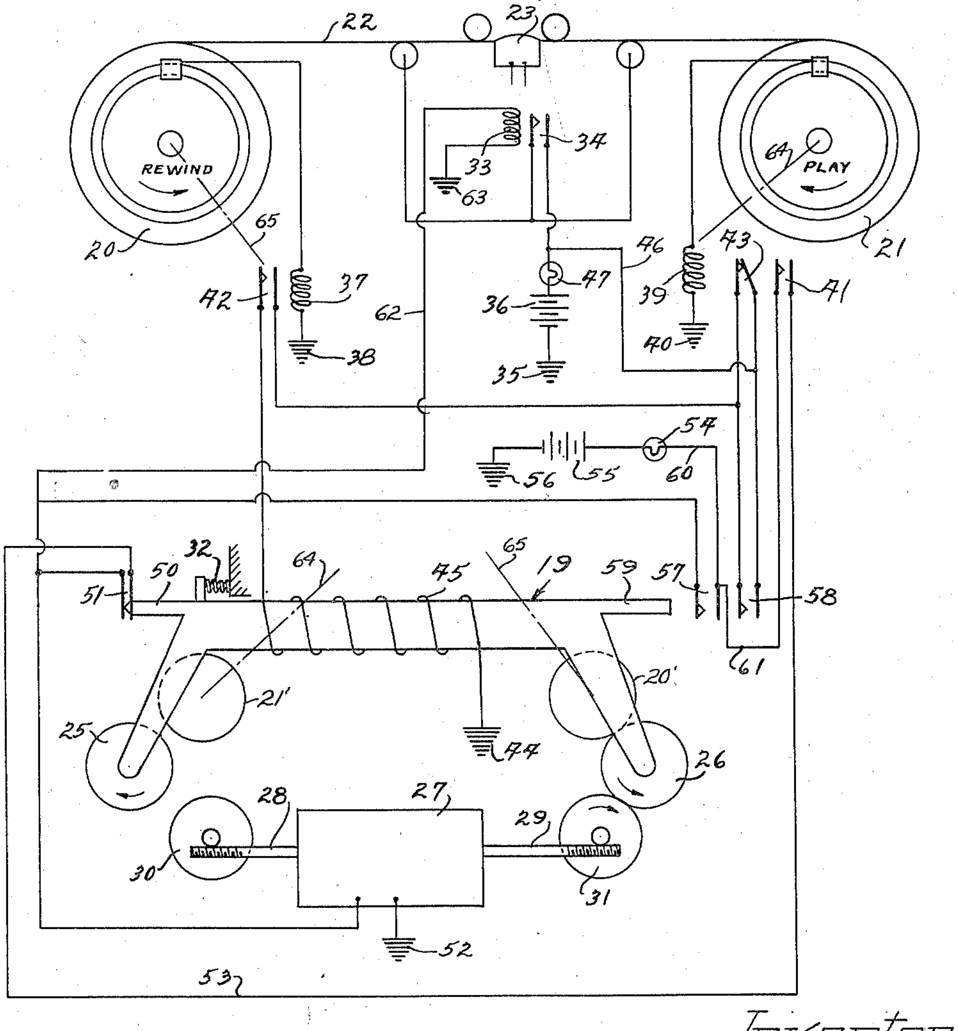
Figure 3 is an electrical wiring diagram for a magnetic recording or reproducing device which device is shown schematically for the purpose of clarity.

In the schematic showing of Figure 3, numerals 20 and 21 denote spools similar to that shown in Figure 1 for unwinding or winding a paramagnetic wire or tape 22. The wire 22 is moved through a magnetic field developed by an electromagnetic recording head of any well known construction 23. In a manner well known in the art, wire 22 may be wound onto spool 21 while being unwound from spool 20 to effect longitudinal magnetization thereof along incremental portions of the length of the wire as it is being passed through the recording head 23 in which head electromagnetic variations are impressed in response to voice or other vibrations falling upon a microphone (not shown) which is in circuit relationship with the recording head. After the wire is completely magnetized and wound on spool 21, the drive is reversed and the wire is rewound on spool 20. After such rewinding is completed, the wire may again be wound onto spool 21 at which time the recording head 23 may be used for reproducing the record appearing on the wire in a reproducing circuit. After the reproducing or playing of the wire has been completed and most of the wire has been wound onto spool 21, the wire is again rewound on spool 20. If desired, the wire may be played (or reproduced) again by winding it onto spool 21 as stated before. In fact, the wire may be played and rewound as many times as desired as in the case of an automatic phonograph record.

When it is desired to induce a new magnetic record on the wire, it is passed through an erasing head which uniformly magnetizes the wire or demagnetizes the wire so as to cause erasure of the magnetic record appearing thereon. After such erasure a new magnetic record may be made on the wire. All the foregoing features of operation are well known in the magnetic recording art.

The present invention, however, is concerned with means for automatically effecting the above indicated rewinding operations and winding operations in response to substantial unwinding of wire from the respective spools.

More specifically, numeral 19 denotes a longitudinally movable carriage having, rotatably supported on one end, friction drive roll 25 and, on the other end, friction drive roll 26. An electric motor 27 is provided with a pair of shafts 28 and 29 having worm gears or other suitable means for effecting rotation of rolls 30 and 31 in opposite directions as indicated by the arrows. A spring 32 normally urges carriage 19 to the left, as illustrated, so that rolls 31 and 26 are in friction drive relationship to effect driving of spool 20, to which roll 26 is coupled, in a direction indicated by the arrow for effecting rewinding of the wire on spool 20. A relay 33, which is included in the motor circuit as indicated by conductors 62 and 63, will, upon energization of the motor circuit, cause switch 34 to close, which switch is normally open when 33 is deenergized. A circuit will, therefore, be completed from ground connection 35, to battery or other electric source of energy 36, pilot light 47, switch 34, thence dividing to two parallel paths, one going through wire 22, through the circuit making and breaking means embodied in spool 20, switch operating coil 37 to a ground connection 38, and the other parallel path extending through wire 22, the circuit making and breaking means embodied in spool 21, switch operating coil 39 to ground 40.

Again referring to Figure 3, all of the circuits shown there are de-energized. Let it be assumed that the supply spool 20 has a quantity of wire thereon, while the spool 21, which is the take-up spool of the recorder, has only several turns of wire wrapped therearound. The apparatus, in this condition, is now ready to be played or is ready to have a magnetic record made on the wire 22.

The relay switch 42 is manually depressed and momentarily held, or this may be conveniently done in any suitable equivalent manner, such as by a push-button switch (not shown) bridging the contacts of the relay 42.

Upon depression of the relay switch 42, the energization circuit to the solenoid 45 is closed through the normally closed relay contacts 43 to the battery 36. Energization of the solenoid 45 causes the movable carriage 19 to move to the right, thus closing contacts 57 and 58 and opening contacts 51.

Closure of contacts 57 and 58 causes closure of the motor circuit to the motor 27 from the battery 55 through contact 57. Energization of the motor circuit simultaneously causes energization of the relay coil 33, which is in the motor circuit thereby closing relay contacts 34. Closure of relay contacts 34 causes relays 37 and 39 to be energized, thus maintaining relay contacts 42 and 41 closed, and also causes opening of relay contacts 43.

The manual or other temporary means necessary to initially close the relay contact 42 is no longer necessary, since the relay 42 is held closed by the energization of the relay coil 37.

The motor 27 now drives the take-up spool 21 through the drive wheel 30, the intermediate drive roller 25, and the driven roller 21′ which is mechanically coupled in any suitable manner as indicated by the dot-dash line 64 to the take-up spool 21.

This operation continues until the wire being unwound from the supply spool 20 no longer bridges the contacts on the spool 20, and thus opens the circuit of the relay 37. Opening of energization circuit of the relay 37 immediately de-energizes the solenoid 45, and the compression spring 32 actuates the movable carriage 19 to the left until the intermediate drive roller 26 is wedged against the drive roll 31, and the driven roll 20′ which is mechanically coupled as is indicated by the dot-dash line 65 to the relay or supply spool 20.

Movement of the carriage 19 to the left causes the circuit contacts 57 and 58 to open and the contacts 51 to close. The motor is still energized for the contacts 41 are still closed due to the continued energization of the relay 39. However, the supply spool 20 is now driven to cause a rewinding of the wire 22 thereon.

After the wire is substantially entirely rewound on the spool 20, the wire finally stops bridging the contacts 11 and 12 on the spool 21. This causes de-energization of the relay 39 which, in turn, opens contacts 41 and closes contacts 43. Opening of the contacts 41 causes de-energization of the motor circuit and, of course, also de-energization of the relay 33 which is connected in the energization circuit of the motor. De-energization of the relay 33 with the opening of its associated contacts 34 completely de-energizes the system.

The machine is now completely shut down and ready for another cycle of operation upon manual closing of the contact 42.

Thus, it will be seen that I have provided an efficient and simple control system for effecting automatic rewinding of a magnetic recording device either after the playing (i. e., reproducing) operation, or after the recording operation, thus enabling persons not skilled in the art to readily control the apparatus and eliminate time loss, such as may be caused by normal waiting periods between playing (reproducing) and rewinding, or vice versa.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. An automatic rewinding system for a magnetic recording or reproducing device including a pair of reels for winding a magnetizable medium from one reel onto the other reel and vice versa, an electrical control circuit including a portion of said magnetizable medium, an electric motor, a pair of friction drive rolls rotated in opposite directions by said motor, a reciprocable carriage, a pair of friction driving means mounted on said carriage, one for each of said drive rolls and reels, and electromagnetic means energized through said electrical control circuit for moving said carriage in a direction to effect disengagement of one of said friction drive rolls from one of said friction driving means and engagement of the other of said friction drive rolls with the other of said friction driving means.

2. An automatic rewinding system for a magnetic recording or reproducing device including a pair of reels for winding a magnetizable medium from one reel onto the other reel, an electrical control circuit including circuit elements mounted on each of said reels, each set of circuit elements being adapted to be bridged by a predetermined amount of the magnetizable medium wrapped around said reel to complete said electrical control circuit, an electric drive means including a motor having a pair of driving rolls rotating in opposite directions, a reciprocable carriage carrying a pair of driven rolls operatively connected to said respective reels, means for normally biasing one of said driven rolls in frictional driving relationship with one of said driving rolls and the other of said driven rolls out of driving relationship with the other of said driving rolls, a motor energizing circuit, and electromagnetic means operable upon completion of said electrical control circuit for moving said carriage to disengage said engaged rolls and engage said disengaged rolls to effect a reversal of the direction of travel of said recording medium.

3. In a magnetic recording or reproducing device having a pair of reels for winding a magnetizable medium from one reel onto the other reel and vice versa, an electrical control circuit including circuit elements mounted on each of said reels, each set of circuit elements being adapted to be bridged by a predetermined amount of the magnetizable medium wrapped around the reel upon which the circuit elements are mounted to complete a current path through said electrical control circuit, a relay in circuit relationship with each set of reel mounted circuit elements, a first control switch adapted to be closed by energization of one of said relays and a second control switch adapted to be opened by energization of the other of said relays, a normally open switch in shunt circuit relationship with said second control switch, a source of electric energy connected through said sets of circuit elements mounted on said reels to energize said relays only so long as a sufficient amount of the magnetizable medium is wound about said respective reels to bridge said sets of circuit elements, drive means for selectively driving one or the other of said reels, said means being in driving engagement with one of said reels whenever said first control switch is open, electromagnetic means adapted to be energized upon closure of both of said control switches to shift said driving means into driving engagement with the other of said reels, and means operable responsive to shifting of said drive means to close said shunt switch whereby the electromagnetic means remains energized despite subsequent opening of the second control switch.

4. In a magnetic recording or reproducing device having a pair of reels for winding a magnetizable medium from one reel onto the other reel and vice versa, an electric motor, a source of electrical energy, a motor circuit for connecting said motor to said source, said circuit including automatic limit switches disposed in parallel circuit relationship, means to selectively couple one or the other of said reels to said motor for movement thereby, and means operable substantially simultaneously with said coupling means for selectively closing one or the other of said limit switches to complete the motor circuit.

5. An automatic control system for a magnetic recording or reproducing device including a pair of reels for winding a magnetizable medium from one reel onto the other reel and vice versa, a pair of rotatable driving means, one rotatable in one direction and the other rotatable in the opposite direction, means adapted to be driven by one or the other of said oppositely rotating driving means for rotating said reels in either of two directions, means normally biasing said driven means into driven engagement with one of said oppositely rotating driving means to drive said reels in one direction, a first circuit including electromagnetic means for shifting said driven means against said bias into driven engagement with the other of said oppositely rotating driving means for rotating said reels in an opposite direction, and a second electrical circuit for controlling energization of said first named circuit.

MARION S. DANISCH.

REFERENCES CITED

The following references are of record in the file of this patent:

UNITED STATES PATENTS

| Number | Name | Date |
|---|---|---|
| 737,998 | Butler | Sept. 1, 1903 |
| 771,861 | Curtis | Oct. 11, 1904 |
| 909,414 | Hytten | Jan. 12, 1909 |
| 947,148 | Browne | Jan. 18, 1910 |
| 1,393,500 | Clark | Oct. 11, 1921 |
| 1,540,121 | Hammond | June 2, 1925 |
| 1,789,607 | Steurer | Jan. 20, 1931 |
| 1,886,856 | Warwick | Nov. 8, 1932 |
| 1,939,181 | McCash et al. | Dec. 12, 1933 |
| 2,351,005 | Camras | June 13, 1944 |
| 2,412,318 | Camras | Dec. 10, 1946 |

FOREIGN PATENTS

| Number | Country | Date |
|---|---|---|
| 297,327 | Great Britain | Dec. 17, 1929 |